United States Patent Office 3,595,711
Patented July 27, 1971

3,595,711
ANTIFRICTION BEARING COMPONENT
MANUFACTURE
Richard L. Faunce and William M. Justusson, Farmington, Mich., assignors to Ford Motor Company, Dearborn, Mich.
No Drawing. Filed June 9, 1969, Ser. No. 831,737
Int. Cl. C21d 1/00
U.S. Cl. 148—144
8 Claims

ABSTRACT OF THE DISCLOSURE

This invention relates to a process for the production of ball bearing inner races from rolled tubing. This rolled tubing is heat treated to produce a carbide particle size of one half to one micron. This very fine carbide particle size resulted in an inner bearing race life exhibiting a B-10 life 2.8 times that of inner bearing races with conventional, larger carbide particles.

THE BACKGROUND

Antifriction bearings, and more particularly ball bearings, have been the object of intensive research in recent years. This research plus the advent of very clean vacuum degassed steels have resulted in the production of bearings of much longer dependable life and higher load carrying ability.

The critical element in ball bearings insofar as failure is concerned is almost inevitably the inner race. The inner races fail in fatigue as the result of the repeated application of extremely high compressive loads locally when a bearing ball passes over the race.

The ball bearings employed in the automotive industry are almost invariably prepared from a steel designated commercially as SAE 52100. This is an economical hypereutectoid steel containing one percent of carbon and about one and one-half percent chromium as the principal alloying ingredients. This steel is purchased in the form of seamless tubing and the individual inner race blanks are obtained by cutting off lengths of this tubing. These lengths must be machined, heat treated and ground to size to form the finished inner race.

THE INVENTION

This invention forms the ball bearing race by a procedure which has been modified to increase the B-10 life of these inner races by a factor of 2.8. The B-10 life of antifriction bearings is defined as the time required to fail ten percent of any given bearing population when tested under carefully standardized and controlled conditions.

The steel employed for the production of inner races according to this invention is also SAE 52100, and is obtained in the form of rolled tubing. The microstructure of this stock tubing is not critical to this invention and either a hot rolled or spheroidized annealed structure is acceptable. If premachining is desirable, a spheroidized structure is preferable.

The first step in the heat treating process is to heat the individual race blanks which have been severed from the tubing stock to a temperature at which the carbon content of the alloy is completely soluble in the gamma iron or austenite. This includes temperatures from 1750° F. up to temperatures limited only by grain growth and the melting point of the steel. In actual practice a temperature of 2000° F. has been employed. A protective atmosphere such as nitrogen is essential to prevent scaling or decarburization. After all of the carbon has been dissolved in the austenite, the tubing is cooled sufficiently rapidly to avoid precipitation of massive carbides along the austenite grain boundaries. Air cooling from 2000° F. is sufficiently rapid for this purpose. This air cooling step will produce a very fine pearlitic structure which is difficult to machine.

These essentially unmachinable blanks are then heat treated to give a spheroidized structure to render them more machinable. This heat treatment spheroidizes the very fine pearlitic structure resulting from the air quench. The preferred treatment is heating at 1395° F. for two hours, although temperatures from 1200° to 1550° F. have been employed with the time at temperature being adjusted inversely as the temperature. After the heating cycle is finished, the parts are air cooled. The cooling rate from the spheroidizing temperature must be sufficiently rapid to prevent carbide growth especially if the heat treatment has intruded into the temperature zone beginning at about 1395° F. at which equilibria are established between austenite and carbide. It is essential to this invention that the cooling rate does not approach that of a full spheroidizing treatment which would permit the growth of the carbide particles to cause them to exceed the preferred size range of one half to one micron.

The spheroidized inner race blanks must be hardened and ground after the completion of the spheroidizing treatment. To harden these races they are austenitized by heating quickly to a temperature in the range of 1525° to 1600° F. and preferably to 1550° F. for about one hour. At this temperature austenite of approximately 0.60 percent carbon is in equilibrium with the undissolved carbides. When the races have become fully austenitized, they are quenched in oil and then tempered to a final hardness of $R_c$ 60 to 64 by a tempering treatment of 250° to 400° F.

Bearing races fabricated according to this process exhibit a B-10 life of 172.7 hours when tested under a hertzian load of 490,000 p.s.i. Bearing races fabricated from the identical tubing by conventional processes and with larger size carbide particles gave a B-170 life of only 61.1 hours, or otherwise stated, this process produced a B-10 life 2.8 times as great as conventional processing.

This invention has been described particularly in connection with the production of antifriction bearing inner races in contradistinction to the balls and the outer races. This is because the inner race durability is normally the factor limiting the life of antifriction bearings. However, the sharp improvement effected by the application of the process of this invention to inner races may well shift the Achilles' heel of the bearing as a unit to the balls or the outer race. In this event further improvement in bearing life may be obtained by applying this process to the balls or the outer races and such is clearly within the scope of this invention.

It is desired to make of record in this document the following publications:

Bamberg, E. N.: "The Effects of Ausforming on the Rolling Contact Fatigue Life of a Typical Bearing Steel," Transactions of the ASME Journal of Engineering for Power, Paper No. 65–Lub–9, pp. 1–10, October 1965.

Bush, J. J., Grube, W. L., Robinson, G. H.: "Microstructural and Residual Stress Changes in Hardened Steel Due to Rolling Contact," Procedure of a Symposium on Rolling Contact Phenomena, pp. 365–399, October 1960, Elsevier Publishing Company, New York, 1962.

We claim as our invention:

1. The process of preparing inner races for antifriction bearings comprising heating a blank of steel effectively devoid of elements forming carbides more refractory than chromium and having metallurgical characteristics indistinguishable from a steel containing 1.00% carbon, 0.35% manganese, 0.30% silicon and 1.45% chromium to a temperature resulting in a completely austenitic structure, air cooling these austenitized races sufficiently rapidly to avoid the formation of any massive carbides and to yield a finely divided pearlitic structure, annealing the cooled races at a temperature from 1200° to 1550° F. for a time sufficient to produce uniformly distributed, predominantly spherical particles of primary carbide ranging downward in size from a maximum of one micron, hardening the annealed blanks by heating to a temperature and for a time period insufficient to produce carbide growth, but sufficient to establish a thermodynamic equilibrium between austenite and undissolved carbide, quenching the heated blanks in a coolant producing a cooling rate approximating that of oil and finally tempering the quenched races to a Rockwell C hardness of 60 to 64.

2. The process recited in claim 1 in which the annealing step is carried out at about 1395° F. and for a time period of about two hours.

3. The process recited in claim 1 in which the heating prior to hardening is at a temperature of 1550° F. for about one hour.

4. The process recited in claim 1 in which the temperature employed for hardening is between 1525° and 1600° F.

5. The process of preparing bearing components for antifriction bearings comprising heating a blank of steel effectively devoid of elements forming carbides more refractory than chromium and having metallurgical characteristics indistinguishable from a steel containing 1.00% carbon, 0.35% manganese, 0.30% silicon and 1.45% chromium to a temperature resulting in a completely austenitic structure, air cooling these austenitized bearing components sufficiently rapidly to avoid the formation of any massive carbides and to yield a finely divided pearlitic structure, annealing the cooled bearing components at a temperature from 1200° to 1550° F. for a time sufficient to produce uniformly distributed, predominantly spherical particles of primary carbide ranging downward in size from a maximum of one micron, hardening the annealed blanks by heating to a temperature and for a time period insufficient to produce carbide growth, but sufficient to establish a thermodynamic equilibrium between austenite and undissolved carbide, quenching the heated blanks in a coolant producing a cooling rate approximating that of oil and finally tempering the quenched bearing components to a Rockwell C hardness of 60 to 64.

6. The process recited in claim 5 in which the annealing step is carried out at about 1395° F. and for a time period of about two hours.

7. The process recited in claim 5 in which the heating prior to hardening is at a temperature of 1550° F. for about one hour.

8. The process recited in claim 5 in which the temperature employed for hardening is between 1525° and 1600° F.

References Cited

UNITED STATES PATENTS 3,369,942    2/1968    Bamberger _____ 148—12.4

RICHARD O. DEAN, Primary Examiner

U.S. Cl. X.R.

148—36, 134